United States Patent
Patten et al.

(10) Patent No.: US 9,747,004 B2
(45) Date of Patent: Aug. 29, 2017

(54) WEB CONTENT NAVIGATION USING TAB SWITCHING

(71) Applicant: Microsoft Technology Licensing, LLC, Redmond, WA (US)

(72) Inventors: Michael J. Patten, Sammamish, WA (US); Michael J. Ens, Redmond, WA (US); Ashmi S. Bhanushali, Kirkland, WA (US); Phu Hoang Le, Bellevue, WA (US); Shawn M. Woods, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 14/066,162

(22) Filed: Oct. 29, 2013

(65) Prior Publication Data

US 2015/0121194 A1    Apr. 30, 2015

(51) Int. Cl.
*G06F 3/0483* (2013.01)
*G06F 3/0488* (2013.01)
*G06F 17/30* (2006.01)
*G06F 3/0486* (2013.01)

(52) U.S. Cl.
CPC .......... *G06F 3/0483* (2013.01); *G06F 3/0486* (2013.01); *G06F 3/0488* (2013.01); *G06F 17/30864* (2013.01); *G06F 17/30899* (2013.01); *G06F 17/30902* (2013.01)

(58) Field of Classification Search
CPC ................................................. G06F 17/30899
USPC .................................. 715/205; 707/E17.108
See application file for complete search history.

(56) References Cited

U.S. PATENT DOCUMENTS

| | | | | |
|---|---|---|---|---|
| 7,130,890 B1 * | 10/2006 | Kumar | ................ | H04L 67/2847 707/999.01 |
| 2012/0151308 A1 * | 6/2012 | Falkenberg | ....... | G06F 17/30899 715/201 |
| 2012/0254780 A1 * | 10/2012 | Mouton | .............. | G06F 3/04883 715/765 |
| 2013/0061160 A1 | 3/2013 | Tseng | | |

(Continued)

OTHER PUBLICATIONS

"Chrome.WebNavigation", Retrieved from <http://developer.chrome.com/extensions/webNavigation.html> on Jul. 30, 2013, Jan. 18, 2013, 12 pages.

(Continued)

*Primary Examiner* — Mohammed-Ibrahim Zuberi (57) ABSTRACT

A Web application maintains a record of Web content that has been displayed by the Web application. The user can navigate to different previously displayed Web content by providing various user inputs, such as a swipe across a touchscreen. The Web application detects when a user input has a threshold likelihood of being a navigation input, such as when the user swipes at least a threshold amount across a touchscreen. When a user input has a threshold likelihood of being a navigation input, the Web application begins rendering in an empty tab the Web content that would be navigated to if the user input were a navigation input, the empty tab becoming a prerender tab. If the user continues and the user input results in a navigation input navigating to the Web content rendered in the prerender tab, then the Web application switches to displaying the prerender tab.

20 Claims, 8 Drawing Sheets

(56) References Cited

U.S. PATENT DOCUMENTS

| | | | | |
|---|---|---|---|---|
| 2013/0073509 A1* | 3/2013 | Burkard | ............ | G06F 17/30864 706/52 |
| 2013/0080930 A1* | 3/2013 | Johansson | ................. | G06F 9/46 715/760 |
| 2013/0304798 A1* | 11/2013 | Chang | ....................... | G06F 9/54 709/203 |
| 2014/0095966 A1* | 4/2014 | Burkard | ............ | G06F 17/30902 715/205 |
| 2014/0372511 A1* | 12/2014 | Kapadia | .................. | H04L 67/02 709/203 |
| 2015/0161177 A1* | 6/2015 | Singh | ................. | G06F 3/04842 707/722 |
| 2015/0195156 A1* | 7/2015 | Agrawal | ................. | H04L 67/36 709/224 |
| 2015/0195329 A1* | 7/2015 | Jain | ........................ | H04L 67/02 709/219 |

OTHER PUBLICATIONS

"Apple—Safari Features", Retrieved from <http://www.apple.com/safari/features.html> on Jul. 30, 2013, Jul. 30, 2013, 15 pages.

"Introducing IE11: The Best Way to Experience the Web on Modern Touch Devices", Retrieved from <http://blogs.msdn.com/b/ie/archive/2013/06/26/introducing-ie11-the-best-way-to-experience-the-web-on-modern-touch-devices.aspx> on Jul. 30, 2013, Jun. 27, 2013, 20 pages.

"HTML Living Standard", 6.5 Session history and navigation—HTML Standard, Last Updated Sep. 16, 2013, retrieve from >>http://www.whatwg.org/specs/web-apps/current-work/multipage/history.html#event-pageshow<< on Nov. 4, 2013, Sep. 16, 2013, 24 pages.

"Grazing Browser—Features", Retrieved from <http://www.grazingbrowser.com/features.php> on Jul. 31, 2013, Nov. 3, 2011, 3 pages.

"Swipe Views—Android Developers", Retrieved from <http://developer.android.com/design/patterns/swipe-views.html> on Jul. 31, 2013, Aug. 15, 2012, 3 pages.

Grigorik, "High Performance Networking in Google Chrome", Retrieved from <http://www.igvita.com/posa/high-performance-networking-in-google-chrome/>, Jan. 31, 2013, 21 pages.

Smolaks, "Microsoft Rolls Out Internet Explorer 11", Retrieved from <ttp://www.techweekeurope.co.uk/news/microsoft-rolls-out-internet-explorer-11-120236> on Jul. 30, 2013, Jun. 27, 2013, 3 pages.

* cited by examiner

WEB CONTENT NAVIGATION USING TAB SWITCHING

BACKGROUND

As computing technology has advanced, computers have become increasingly interconnected. This interconnection allows large amounts of data to be available to computers, such as Web pages from numerous Web sites. Having such a large amount of data available is useful, but is not without its problems. One such problem is that it can be time consuming to have the Web pages the user desires obtained and displayed. This can lead to a frustrating user experience due to delays in the user being able to see the Web pages he or she desires.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an empty tab of a Web application is generated and first Web content is displayed in a visible tab of the Web application. While displaying the first Web content in the visible tab, a user input that has a threshold likelihood of being a navigation gesture but that is not yet a navigation gesture is detected. Second Web content that would be navigated to if the user input were the navigation gesture is identified and rendering of the second Web content in the empty tab is begun, the empty tab becoming a prerender tab. In response to the user input becoming the navigation gesture, the prerender tab is switched to being the visible tab, resulting in displaying the second Web content.

In accordance with one or more aspects, an empty tab of a Web application is generated and first Web content is displayed in a visible tab of the Web application. While displaying the first Web content in the visible tab, a user input that has a threshold likelihood of being a navigation input to navigate to second Web content identified in a travel log is detected, the travel log identifying previously accessed Web content. Rendering of the second Web content in the empty tab is begun, the empty tab becoming a prerender tab. In response to the user input becoming the navigation input, the prerender tab is switched to being the visible tab, resulting in displaying the second Web content.

BRIEF DESCRIPTION OF THE DRAWINGS

The same numbers are used throughout the drawings to reference like features.

DETAILED DESCRIPTION

Web content navigation using tab switching is discussed herein. A Web application displays Web content in a user interface (UI) or visible tab. The Web application maintains a record of at least some of the Web content that has been displayed by the Web application, also referred to as a travel log. The Web application also maintains an empty tab that hosts no Web content or hosts primitive Web content (e.g., a blank Web page). The user can navigate to different previously displayed Web content by providing a variety of different user inputs, such as a swipe or other gesture across a touchscreen, a wave or other gesture (e.g., in mid-air) captured by a camera, and so forth.

The Web application detects when a user input has a threshold likelihood of being a navigation input, such as when the user swipes at least a threshold amount across a touchscreen. When a user input has a threshold likelihood of being a navigation input, the Web application begins rendering in an empty tab the Web content that would be navigated to if the user input were a navigation input. After the Web application begins rendering the Web content in the empty tab, the empty tab can be referred to as a prerender tab. If the user continues with the user input and the user input results in a navigation input navigating to the Web content rendered in the prerender tab, then the Web application switches to displaying the prerender tab (the prerender tab becoming the visible tab). However, if the user does not continue with the user input or the user input does not result in a navigation input, then the rendering of the Web content in the prerender tab need not be completed and the prerender tab does not become the visible tab.

Figure 1:
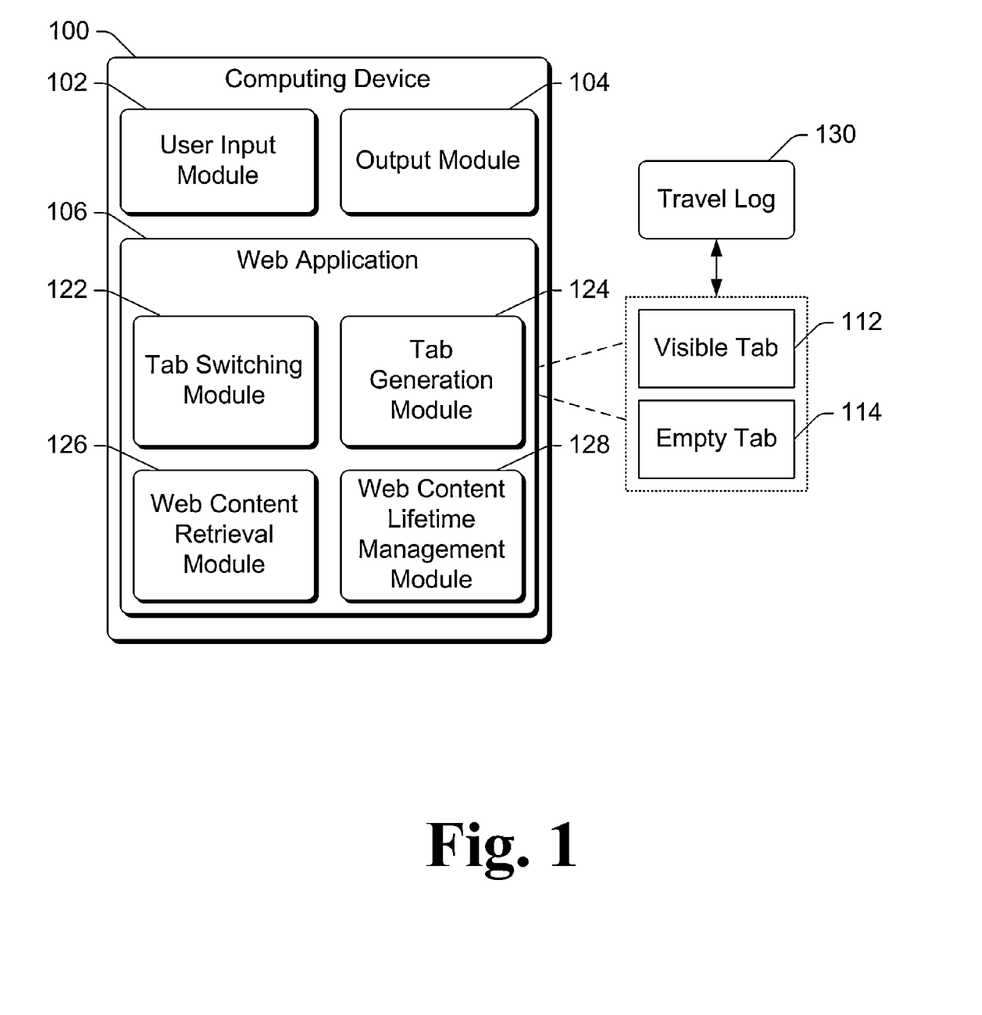
FIG. 1 is a block diagram illustrating an example computing device implementing the Web content navigation using tab switching in accordance with one or more embodiments.

FIG. 1 is a block diagram illustrating an example computing device 100 implementing the Web content navigation using tab switching in accordance with one or more embodiments. The computing device 100 can be a variety of different types of devices, such as a physical device or a virtual device. For example, the computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 100 can also be a virtual device, such as a virtual machine running on a physical device. A virtual machine can be run on any of a variety of different types of physical devices (e.g., any of the various types listed above). Thus, the computing device 100 may range from full resource devices with substantial memory and processor resources (e.g., personal computers, game consoles) to low-resource devices with limited memory and/or processing resources (e.g., traditional set-top boxes, handheld game consoles).

The computing device 100 includes a user input module 102, an output module 104, and a Web application 106. The user input module 102 receives user inputs from a user of the computing device 100. User inputs can be provided in a variety of different manners, such as by pressing one or more keys of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100. User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the computing device 100 (e.g., by the Web application 106). This content can be, for example, a display or playback portion of a user interface (UI). The content can be displayed or otherwise played back by components of the computing device 100 (e.g., speakers, interactive display devices, etc.). Alternatively, the output module 104 can generate one or more signals that are output to other devices or components (e.g., speakers, display devices, etc.) that are separate from the computing device 100.

The Web application 106 is an application or program that displays or otherwise presents Web content. The Web application 106 can be implemented as a separate application run by an operating system of the computing device 100, or alternatively as at least part of the operating system of the computing device 100. Web content refers to various types of electronic content that can be displayed or otherwise presented by the computing device 100. The Web content is typically written in a markup language, such as eXtensible Markup Language (XML) or HyperText Markup Language (HTML). The Web content can also include content written in other languages, such as JavaScript, Cascading Style Sheets (CSS), and so forth. In one or more embodiments, the Web content is a Web page.

In one or more embodiments, the Web content is one or more Web pages, and the Web application 106 is a Web browser that obtains the Web pages from various Web sites via a network such as the Internet, a local area network (LAN), a public telephone network, an intranet, other public and/or proprietary networks, combinations thereof, and so forth. Alternatively, the Web application 106 can be other types of applications that obtain Web pages or other Web content from Web sites or other sources, such as audio/video playback applications, electronic book or magazine readers, and so forth.

Additionally, in one or more embodiments the Web application 106 supports both a visible tab 112 and an empty tab 114. Each tab 112, 114 is a container (e.g., a data structure) that hosts (e.g., stores) Web content. Web content hosted by the visible tab 112 is displayed by the Web application 106. Although Web content is discussed herein as being displayed, it should be noted that Web content can additionally or alternatively be presented in other manners, such as being played back audibly. The empty tab 114 refers to a tab that hosts no Web content or alternatively very simple or primitive Web content (e.g., Web content that results in no display or less than a threshold amount of data being displayed, such as a blank Web page (a Web page that includes no HTML) or a Web page that displays the words "Empty page"). The Web application 106 can support any number of empty tabs 114 concurrently. The empty tab 114 is not displayed by the Web application 106, and thus is also referred to as a hidden tab. The empty tab 114 can, however, become a visible tab 112 as discussed in more detail below.

The Web application 106 includes multiple modules that facilitate usage of the tabs 112 and 114. Although these modules are illustrated as being part of the Web application 106, it should be noted that one or more of the modules can be implemented by other applications or programs (e.g., by an operating system of the computing device 100). These modules include a tab switching module 122, a tab generation module 124, a Web content retrieval module 126, and a Web content lifetime management module 128.

The tab switching module 122 manages the tabs 112 and 114. The tab switching module 122 detects when a user input has a threshold likelihood of being a navigation input. A navigation input refers to an input to navigate (e.g., backwards or forwards) to previously accessed Web content. In response to detecting that a user input has a threshold likelihood of being a navigation input, the tab switching module 122 begins rendering in the empty tab 114 the Web content that would be navigated to if the user input were the navigation input. Once the tab switching module 122 begins rendering the Web content in the empty tab 114, the empty tab 114 can be referred to as a prerender tab. A prerender tab is a tab that is hidden (is not a visible tab) and is a tab in which Web content has begun to be rendered. Thus, the tab 114 can be an empty tab or a prerender tab at different times, depending on whether the module 122 has begun rendering the Web content in the tab 114. If the user continues with the user input and the user input results in a navigation input navigating to the Web content rendered in the prerender tab, then the Web application 106 switches to displaying the prerender tab. However, if the user does not continue with the user input or the user input does not result in a navigation input, then the rendering of the Web content in the prerender tab need not be completed.

The tab generation module 124 determines when to create, and creates, new tabs. In one or more embodiments, the tab generation module 124 creates new tabs as empty tabs, which can be subsequently switched to being a visible tab as discussed in more detail below. The Web content retrieval module 126 retrieves or otherwise obtains Web content to be hosted by a tab 112 or 114. The Web content lifetime management module 128 manages how long Web content is maintained.

The Web application 106 also maintains a history record or travel log 130, which is a record of the Web content that the Web application 106 has accessed. In one or more embodiments, the travel log 130 is a record of Web content that the Web application 106 has accessed since the Web application 106 began running on the computing device 100, thus a new travel log is generated each time the Web application 106 is executed. Alternatively, the travel log 130 can be maintained across different executions of the Web application 106, such as being stored when the Web application 106 ceases execution and being retrieved when the Web application 106 is subsequently run again. The travel log 130 can additionally or alternatively be reset (e.g., cleared) at various times, such as after the Web application 106 has been running for a particular amount of time, in response to other events or user requests, and so forth.

The travel log 130 can be thought of as a path through various different Web content that the Web application 106 displays. This can include going forward and backward along the path (navigating forward and backward through different Web content), branching off to different Web content, accessing new Web content that is added to the path, and so forth. Each time a user input requesting to display new Web content is received, other than navigating forward or backward along the path, that new Web content becomes the next Web content in the path (going forward through the path) from whatever Web content was being displayed when the user request was received.

In one or more embodiments, the travel log 130 also maintains state information for each Web content accessed by the Web application 106. The state information identifies settings used when displaying the Web content and/or additional information describing how the Web content was displayed. For example, the state information can include a location of the Web content that was displayed (e.g., a portion of a Web page that the user scrolled or otherwise navigated to), a zoom setting for the Web content (e.g., whether the user zoomed in or out of the Web content when displaying the Web content), and so forth.

In one or more embodiments, each tab 112 and 114 has an associated travel log. The travel log can be associated with the tab at different times, such as when the tab is created, when Web content begins to be rendered in an empty tab 114 as discussed in more detail below, and so forth. The travel log can be copied from another tab (e.g., the visible tab 112) when a new tab is created, or alternatively obtained in other manners (e.g., a travel log stored during a previous execution of the Web application 106). Alternatively, the Web application 106 can have a single travel log associated with all tabs 112 and 114.

Figure 2:
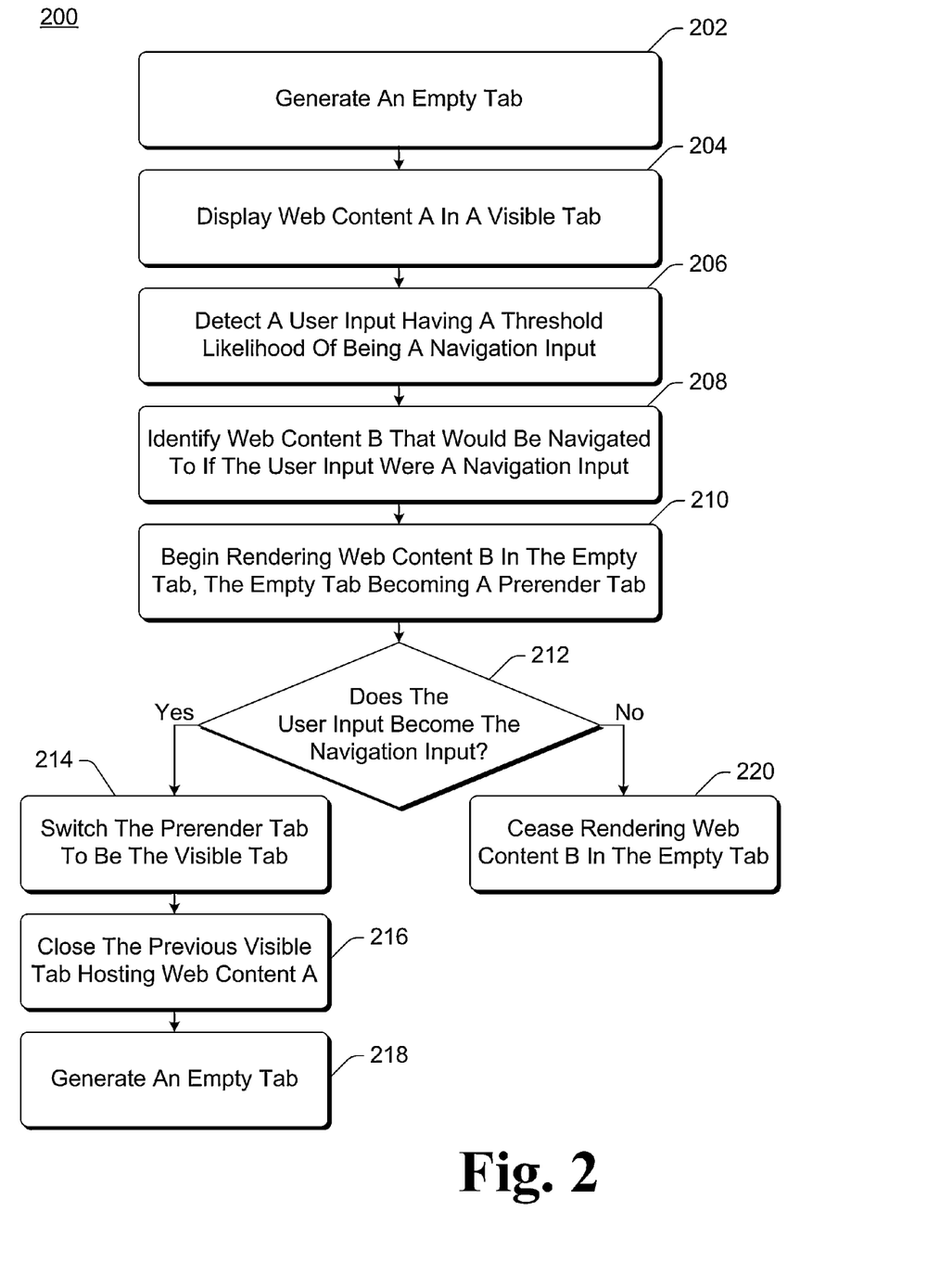
FIG. 2 is a flowchart illustrating an example process for implementing the Web content navigation using tab switching in accordance with one or more embodiments.

FIG. 2 is a flowchart illustrating an example process 200 for implementing the Web content navigation using tab switching in accordance with one or more embodiments. Process 200 is carried out by a Web application, such as Web application 106 of FIG. 1, and can be implemented in software, firmware, hardware, or combinations thereof. Process 200 is shown as a set of acts and is not limited to the order shown for performing the operations of the various acts. Process 200 is an example process for implementing the Web content navigation using tab switching; additional discussions of implementing the Web content navigation using tab switching are included herein with reference to different figures.

In process 200, an empty tab is generated or created (act 202). An empty tab refers to a tab that hosts no Web content or alternatively hosts primitive Web content as discussed above. Generation or creation of a tab can include various actions, such as having memory allocated for the tab, having various data structures created, having various objects generated and registered with an operating system of the computing device 100, and so forth.

Web content A is displayed in a visible tab (act 204). Web content A can be any of a variety of different types of Web content, such as a Web page, as discussed above. Web content A can be identified in any of a variety of manners, such as by the user selecting a particular link, entering a particular address or identifier of Web content, navigating through previously accessed Web content, and so forth.

A user input is received, and the user input having a threshold likelihood of being a navigation input is detected (act 206). A navigation input refers to an input to navigate back to Web content that was previously displayed or otherwise accessed (e.g., backwards through the travel log), or to navigate forward to Web content that was previously displayed or otherwise accessed (e.g., forwards through the travel log). The user input can be any of a variety of different user inputs that are non-atomic navigation inputs. A non-atomic navigation input refers to a user input that requests navigating to particular Web content and that involves multiple actions or inputs. For example, selecting a button (e.g., clicking on the button or touching the button) to navigate forward or backward to different Web content is an atomic (not a non-atomic) navigation input—the input is a single action of selecting the button. By way of another example, a gesture swiping across a touchscreen or a hand motion (e.g., waving) through the air to indicate to navigate forward or backward to different Web content is a non-atomic navigation input—the user begins the swipe or hand waving and continues for some amount of time before the gesture or hand waving is detected as being the navigation input.

The user input can take various forms. For example, the user input can be a gesture, such as swiping a finger across a touchscreen or touchpad, waving or otherwise moving a hand or finger through the air, and so forth. By way of another example, the user input can be an audible input, such as the phrase "navigate back" or "last page".

A threshold likelihood of a user input being a navigation input can be determined in different manners, depending at least in part on the nature of the user input. In one or more embodiments, if the user input has completed at least a threshold amount of the navigation input, but has not yet completed the navigation input (otherwise the navigation input itself would be detected), then the user input has a threshold likelihood of being a navigation input. For example, if a user gesture swiping from right to left across at least 80% of a touchscreen or touchpad were the navigation input (a navigation gesture in this case) to navigate back, then the user input can have a threshold likelihood of being the navigation input if the user input swipes from right to left across at least 20% of the touchscreen or touchpad but less than 80% of the touchscreen or touchpad (if the user input were to swipe from right to left across 80% of the touchscreen or touchpad, then the user input would be the navigation input). Similarly, if a user gesture swiping from left to right across at least 80% of a touchscreen or touchpad were the navigation input (a navigation gesture in this case) to navigate forward, then the user input can have a threshold likelihood of being the navigation input if the user input swipes from left to right across at least 20% of the touchscreen or touchpad but less than 80% of the touchscreen or touchpad.

By way of another example, if a user gesture waving a hand from right to left through the air for at least a threshold distance (e.g., a foot) were the navigation input (a navigation gesture in this case) to navigate back, then the user input can have a threshold likelihood of being the navigation input if the user input is movement of the hand from right to left at least 20% of the threshold distance but less than the threshold distance (if the user input were to be movement of the hand from right to left for the threshold distance, then the user input would be the navigation input). Similarly, if a user gesture waving a hand from left to right through the air for at least a threshold distance (e.g., a foot) were the navigation input (a navigation gesture in this case) to navigate forward, then the user input can have a threshold likelihood of being the navigation input if the user input is movement of the hand from left to right at least 20% of the threshold distance but less than the threshold distance.

By way of another example, if an audible input of "navigate back" were the navigation input to navigate back, then the user input can have a threshold likelihood of being the navigation input if the user input is the word "navigate" or a portion (e.g., the first syllable) of the word "navigate" but less than the entire phrase "navigate back" (if the user input were to be the entire phrase "navigate back" then the user input would be the navigation input).

Figure 3:
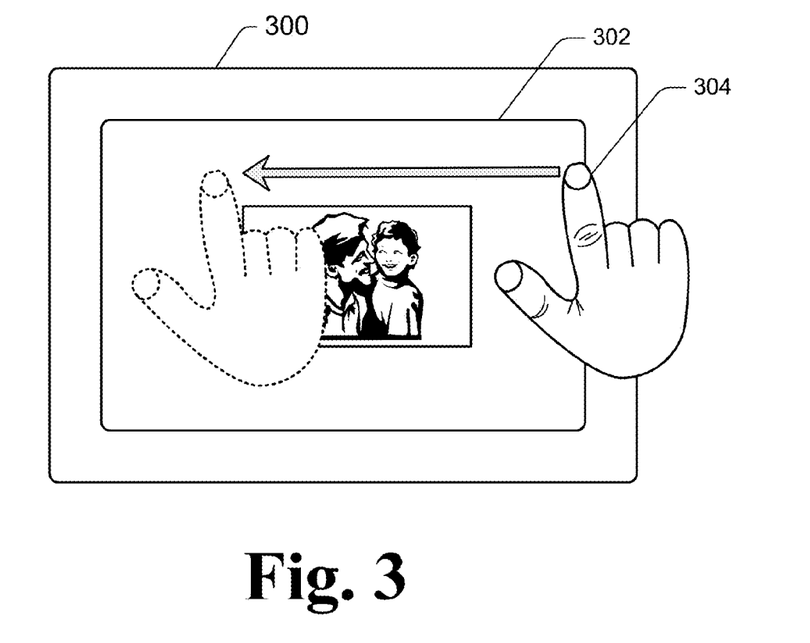
FIG. 3 illustrates an example display device with an example user input.

FIG. 3 illustrates an example display device 300 with an example user input. The display device 300 includes a touchscreen area 302 that both displays content and senses touch input. Although illustrated as a touchscreen, the area 302 could alternatively be a touchpad (e.g., and display no content). A user input is received via a user's finger 304. The example of FIG. 3 assumes that the navigation input for navigating back to previously accessed Web content is swiping the user's finger 304 across the touchscreen area 302 from right to left. If the user starts near the right side of the touchscreen area 302 (illustrated using a solid outline of a hand) and swipes his or her finger right to left (illustrated by the arrow) at least a threshold distance across the touchscreen area 302 (e.g., at least as far as the location illustrated using a dashed outline of a hand in FIG. 3), then the user input is determined to be a navigation input for navigating back to previously accessed Web content.

Figure 4:
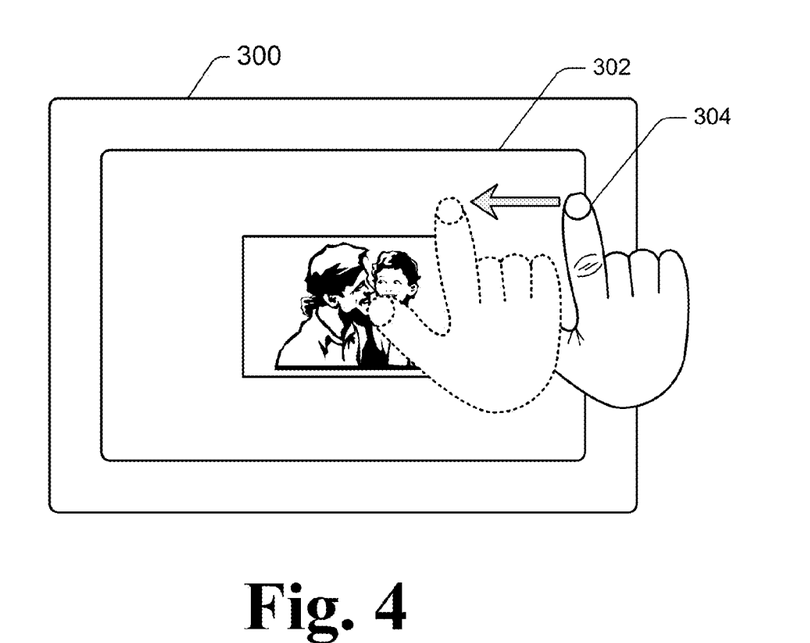
FIG. 4 illustrates an example display device with the user input having a threshold likelihood of being a navigation input.

As the user swipes his or her finger from right to left across the touchscreen area 302, his or her finger passes through multiple different locations of the touchscreen area 302. FIG. 4 illustrates the example display device 300 of FIG. 3 with the user input having a threshold likelihood of being a navigation input. In FIG. 4, the user's finger 304 has swiped a threshold distance across the touchscreen area (e.g., as far as the location illustrated using a dashed outline of a hand in FIG. 4), in response to which the user input is detected as having a threshold likelihood of being a navigation input. It should be noted that, as illustrated in FIG. 4, the user has not yet swiped his or her finger far enough across the touchscreen area 302 for the user input to be the navigation input for navigating back to previously accessed Web content. Thus, the threshold distances for the swipe across the touchscreen area 302 being a navigation input (as illustrated in FIG. 3) and having a threshold likelihood of being a navigation input (as illustrated in FIG. 4) are two different distances.

Returning to FIG. 2, Web content that would be navigated to if the user input were a navigation input is identified (act 208). The navigation input in act 208 is the navigation input that the user input has a threshold likelihood of being as detected in act 206. The travel log indicates which Web content would be navigated to for different navigation inputs, such as navigation back or navigation forward. For example, assume the user accesses Web content A, then Web content B, then Web content C. The travel log indicates that Web content A, Web content B, and Web content C were accessed and displayed, and the order in which they were accessed and displayed. While displaying Web content C, if the user then were to provide a user input indicating navigate back, the Web application would navigate back to display Web content B. While displaying Web content B, if the user were to provide a user input indicating navigate forward, the Web application would navigate forward to display Web content C. However, while displaying Web content B, if the user were to provide a user input indicating navigate back, the Web application would navigate back to display Web content A.

The Web application begins rendering the Web content in the empty tab (act 210). This Web content is the Web content identified in act 208, and the empty tab is the empty tab previously generated in act 202 (e.g., generated prior to detection of the user input having a threshold likelihood of being a navigation input in act 206). The Web application begins rendering the Web content, but may not finish rendering the Web content if the user input does not become the navigation input as discussed below. Rendering the Web content in the empty tab refers to obtaining the Web content, storing the Web content in the empty tab so that the Web content can be displayed, opening any communication channels with other devices or services indicated by the Web content, obtaining any other content (e.g., images, audio files, etc.) identified in the Web content, and so forth. Because Web content has begun to be rendered in the empty tab, the empty tab is referred to as changing to or becoming a prerender tab rather than an empty tab.

It should be noted that the Web content can be obtained in act 210 from one of more of a variety of different sources. If the Web content is not already stored on the device implementing the Web application, then the Web content is retrieved from a source of the Web content (e.g., a server or device accessed via the Internet or other data network) by the Web content retrieval module 126 of FIG. 1. Alternatively, the Web content may already be stored on the device implementing the Web application, and thus retrieved locally. The Web content may be stored on the device in different manners, such as in a cache (possibly being serialized or otherwise transformed prior to or as part of being written) on a hard drive or other storage component of the device, in a data structure in the same memory as the Web application (e.g., in Random Access Memory), and so forth.

Process 200 proceeds based on whether the user input becomes the navigation input (act 212), for example whether the user completes the gesture or other user input that is the navigation input. If the user input becomes the navigation input, then the tab switching module switches the prerender tab (in which rendering of the Web content began in act 210) to be the visible tab (act 214). By switching the prerender tab to being the visible tab, the Web content rendered in the prerender tab is displayed. In one or more embodiments, the tab switching module 122 of FIG. 1 switches the prerender tab to be the visible tab after rendering of the Web content in the prerender tab completes. The rendering of the Web content in the prerender tab completes when all of the Web content has been stored in the prerender tab so that the Web content can be displayed, any communication channels with other devices or services indicated by the Web content have been opened, any other content (e.g., images, audio files, etc.) identified in the Web content have been obtained, and so forth. Alternatively, the tab switching module 122 can switch the prerender tab to be the visible tab prior to completing rendering of the Web content in the prerender tab, and complete rendering the Web content in the visible tab.

In one or more embodiments, switching the prerender tab to being the visible tab includes using the state information in the travel log for the Web content rendered in the prerender tab to return the Web content to the state it was in when the user previously accessed the Web content (e.g., so the Web content is displayed in the same manner as it was displayed when the user previously accessed the Web content). For example, the Web content can be scrolled to a particular portion of the Web content that was last displayed, can be zoomed in or out, and so forth. The tab switching module can return the Web content to the state the Web content was in prior to switching the prerender tab to being the visible tab and/or after switching the prerender tab to being the visible tab. For example, the tab switching module can attempt to return the Web content to the state the Web content was in prior to switching the prerender tab to being the visible tab, but if the attempt is unsuccessful (or takes longer than a threshold amount of time), then the tab switching module can switch the prerender tab to being the visible tab and return the Web content to the state the Web content was in after switching the prerender tab to being the visible tab.

Similarly, in one or more embodiments switching the prerender tab to being the visible tab includes storing state information in the travel log for the Web content that was previously displayed in the visible tab. Thus, if navigation inputs result in the Web content being displayed again in the visible tab, the state information for the Web content is available in the travel log.

The tab switching module can manage switching the prerender tab to being the visible tab in a variety of different manners. In one or more embodiments, the tab switching module fades from the previous visible tab being displayed to the new visible tab (which was previously the prerender tab) being displayed over a particular amount of time (e.g., 100 milliseconds, although other amounts of time can alternatively be used). Alternatively, the tab switching module can abruptly change to display the new visible tab without any such fading.

The previous visible tab (displaying Web content in act 204) is closed (act 216). The previous visible tab can be closed in a variety of different manners, such as unloading the visible tab, which refers to deleting or otherwise removing the Web content from the visible tab that was hosting the Web content. The visible tab that hosted the unloaded Web content can be deleted, in which case the various actions taken to generate the tab are undone (e.g., memory for the tab is de-allocated, created data structures are deleted, objects generated and registered with an operating system of the computing device 100 are deleted, and so forth). Alternatively, the visible tab that hosted the unloaded Web content can become an empty tab of the Web application.

Alternatively, rather than unloading the Web content, the previous visible tab can be closed in other manners. For example, the Web content can be suspended and maintained in a hidden tab (hidden analogous to the empty tab 114 of FIG. 1, although the tab is not empty). Web content being suspended refers to ceasing execution of instructions in the Web content, ceasing performance of operations and/or actions by the Web content, and so forth. Although suspended, the Web content can remain in the same type of memory as the Web application 106 (e.g., Random Access Memory of the computing device 100). By way of another example the Web content can be cached by being written to another storage device or memory (possibly being serialized or otherwise transformed prior to or as part of being written).

A new empty tab is also generated (act 218). The new empty tab is generated in the same manner as discussed above in act 202. Alternatively, if the previous visible tab becomes an empty tab as a result of closing the previous visible tab in act 216, then a new empty tab need not be generated in act 218.

Returning to act 212, if the user input does not become the navigation input, then the tab switching module ceases rendering the Web content in the prerender tab (act 220). The user input does not become the navigation input as a result of the user input not satisfying the criteria for the navigation input, such as the user not swiping from right to left across at least 80% of a touchscreen or touchpad (if swiping from right to left across at least 80% of a touchscreen or touchpad were the navigation input), the user not waving a hand from right to left through the air for at least a threshold distance (if waving a hand from right to left through the air for at least a threshold distance were the navigation input), if the user does not utter the entire phrase "navigate back" (if an audible input of "navigate back" were the navigation input), and so forth. The prerender tab can optionally be cleared in act 220, which refers to deleting or otherwise removing the Web content from the prerender tab (although the Web content may still remain cached on the device implementing the Web application), the prerender tab becoming an empty tab. Alternatively, the prerender tab may not be cleared in act 220, and the Web content can be maintained in the prerender tab (e.g., thus being available in the prerender tab if a subsequent user input to navigate to or having a threshold likelihood of being an input to navigate to the Web content B were to be received). The Web content can be maintained in the prerender tab until the prerender tab is deleted or otherwise used (e.g., until a user input having a threshold likelihood of being a navigation input to different Web content is received, in which case the prerender tab can be cleared and this different Web content rendered in the tab).

In the discussions herein, reference is made to an empty tab being previously generated and the Web application beginning to render the Web content in the previously generated empty tab. However, situations can arise in which an empty tab has not been previously generated. In such situations, an empty tab can be generated as needed. For example, an empty tab can be generated in response to the user input detected in act 206, and rendering of the appropriate Web content in the empty tab can begin in act 210. Alternatively, a prerender tab can be generated in response to the user input detected in act 206, and rendering of the appropriate Web content in the prerender tab can begin in act 210. Thus, any additional time or resources consumed in generating an empty tab that becomes a prerender tab can be avoided.

Figure 5:
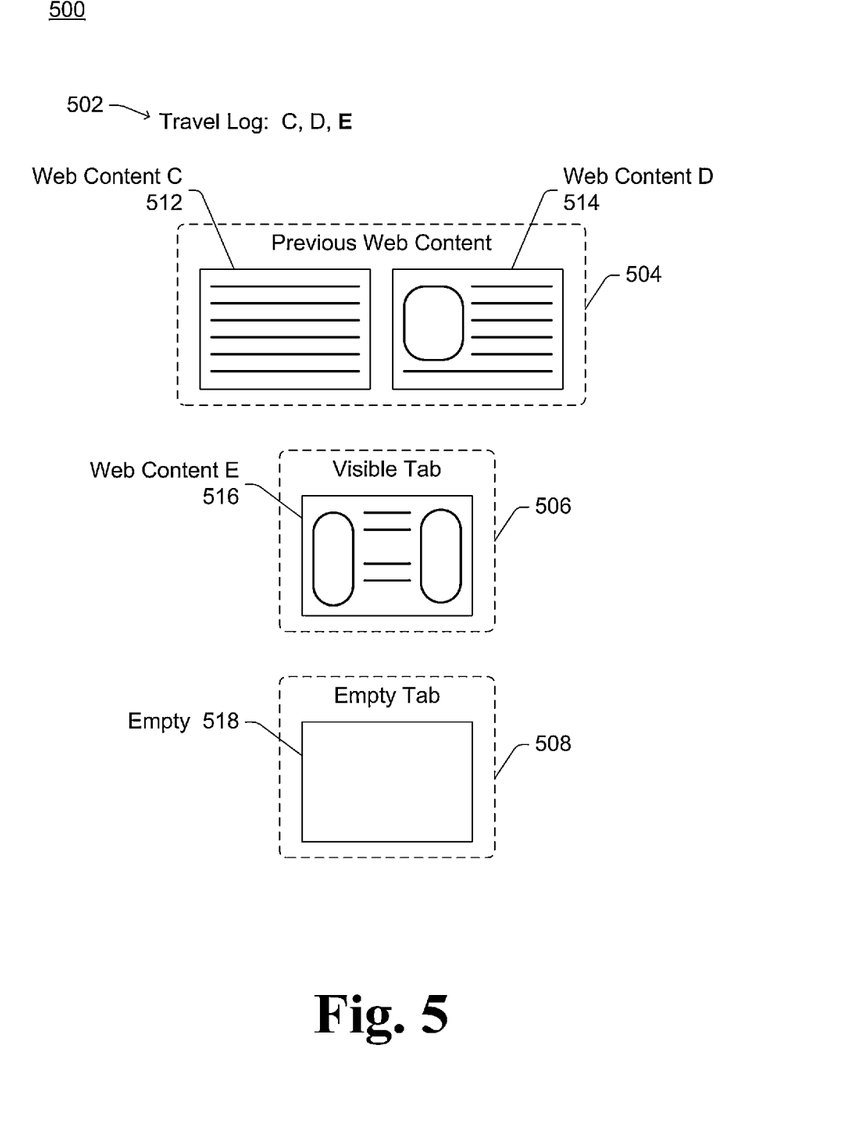
FIGS. 5, 6, 7, and 8 illustrate examples of Web content navigation using tab switching in accordance with one or more embodiments.

FIGS. 5-8 illustrate examples of Web content navigation using tab switching in accordance with one or more embodiments. FIG. 5 illustrates example information 500 for Web content accessed by a Web application. The information 500 includes a travel log 502 indicating that the Web content C, Web content D, and Web content E has been accessed in that order. The travel log 502 also includes an indication that the Web content E is currently visible. The information 500 includes previous Web content 504, a visible tab 506, and an empty tab 508. The previous Web content 504 includes Web content C 512 that is text (illustrated as lines) and Web content D 514 that is text and a picture (illustrated as lines and a rounded rectangle), both of which were previously accessed by the Web application. As discussed above, the previous Web content 504 can be stored on the device implementing the Web application in any of a variety of different manners (e.g., in a cache), or alternatively may no longer be stored on the device.

The visible tab 506 displays Web content E 516 that is text and pictures (illustrated as lines and rounded rectangles). The empty tab 508 includes empty or primitive content 518 (e.g., a blank Web page).

In the examples of FIGS. 5-8, a single travel log for the Web application is illustrated. Alternatively, each tab (e.g., each visible tab and each empty tab) can have its own corresponding travel log 502. A travel log can be associated with an empty tab at different times as discussed above, such as when the Web application begins rendering Web content in the empty tab (e.g., in act 210 of FIG. 2).

Figure 6:
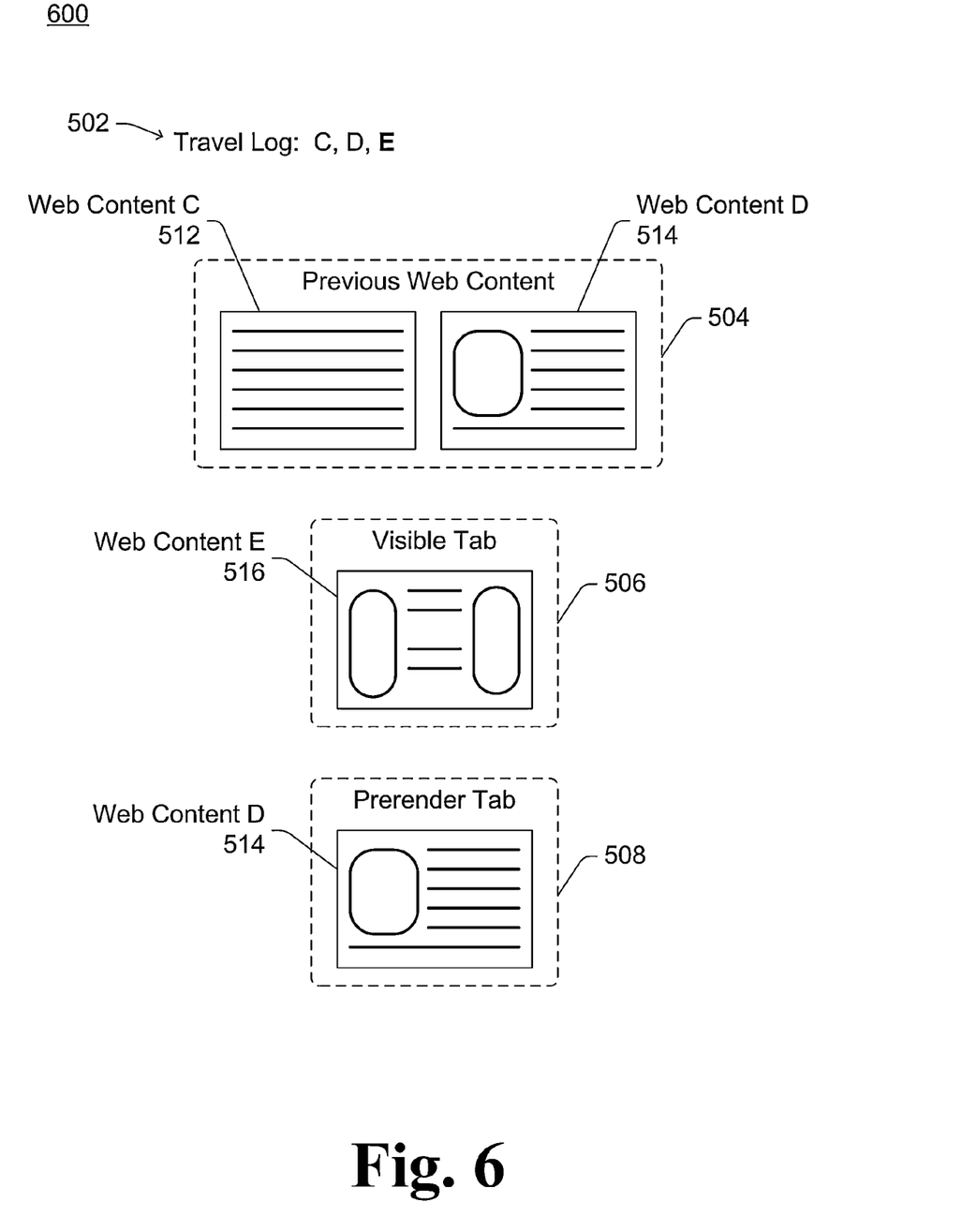

In response to detecting a user input having a threshold likelihood of being a navigation input to navigate back, the Web application begins rendering Web content D in the empty tab 508, which becomes a prerender tab. The travel log 502 indicates the order in which Web content was accessed, so navigating back from Web content E would be navigating to Web content D. FIG. 6 illustrates example information 600 resulting from detecting a user input having a threshold likelihood of being a navigation input to navigate back based on the information 500 of FIG. 5. The information 600 includes previous Web content 504 and a visible tab 506 analogous to information 500. However, in the tab 508 (now a prerender tab) the Web content D 514 is beginning to be rendered.

Figure 7:
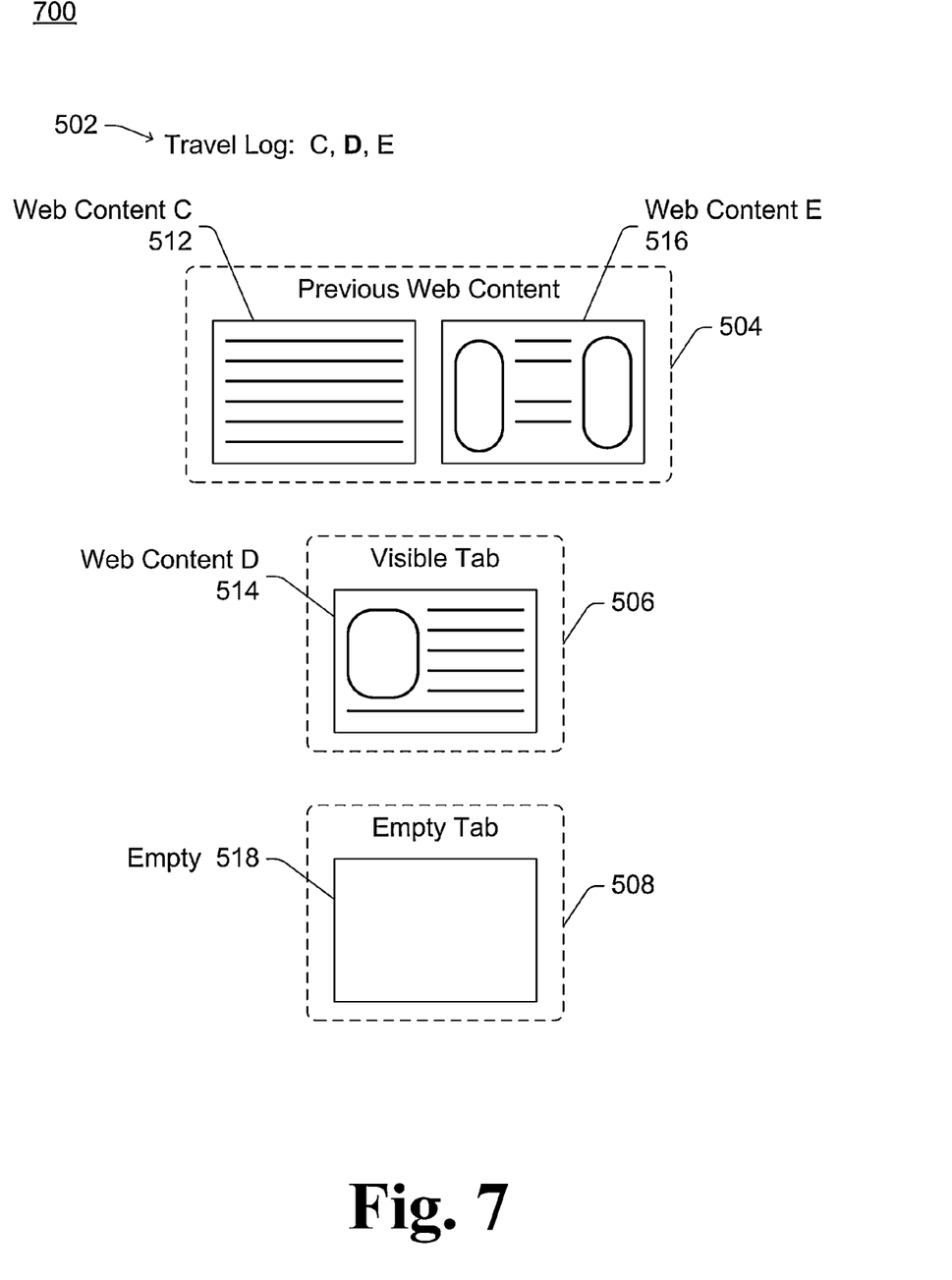

If the user input becomes the navigation input to navigate back, then the Web application switches to displaying Web content D 514. FIG. 7 illustrates example information 700 resulting from the user input becoming the navigation input to navigate back based on the information 600 of FIG. 6. The information 700 includes the travel log 502 indicating that the Web content C, Web content D, and Web content E has been accessed in that order. However, the travel log 502 now indicates that the user has navigated back to Web content D and thus that Web content D is currently visible. The previous Web content 504 now includes both Web content C 512 and Web content E 516, the previous prerender tab is now the visible tab so the visible tab 506 now includes Web content D 514, and the empty tab 508 now includes the empty or primitive content 518. The empty tab 508 can be a newly created empty tab, or a previously created tab (e.g., a visible tab that was closed).

Returning to FIG. 6, if the user input does not become the navigation input to navigate back, then the Web application ceases rendering the Web content in the prerender tab 508 and does not switch to displaying Web content D 514. FIG. 5 illustrates example information 500 resulting from the user input not becoming the navigation input to navigate back.

Figure 8:
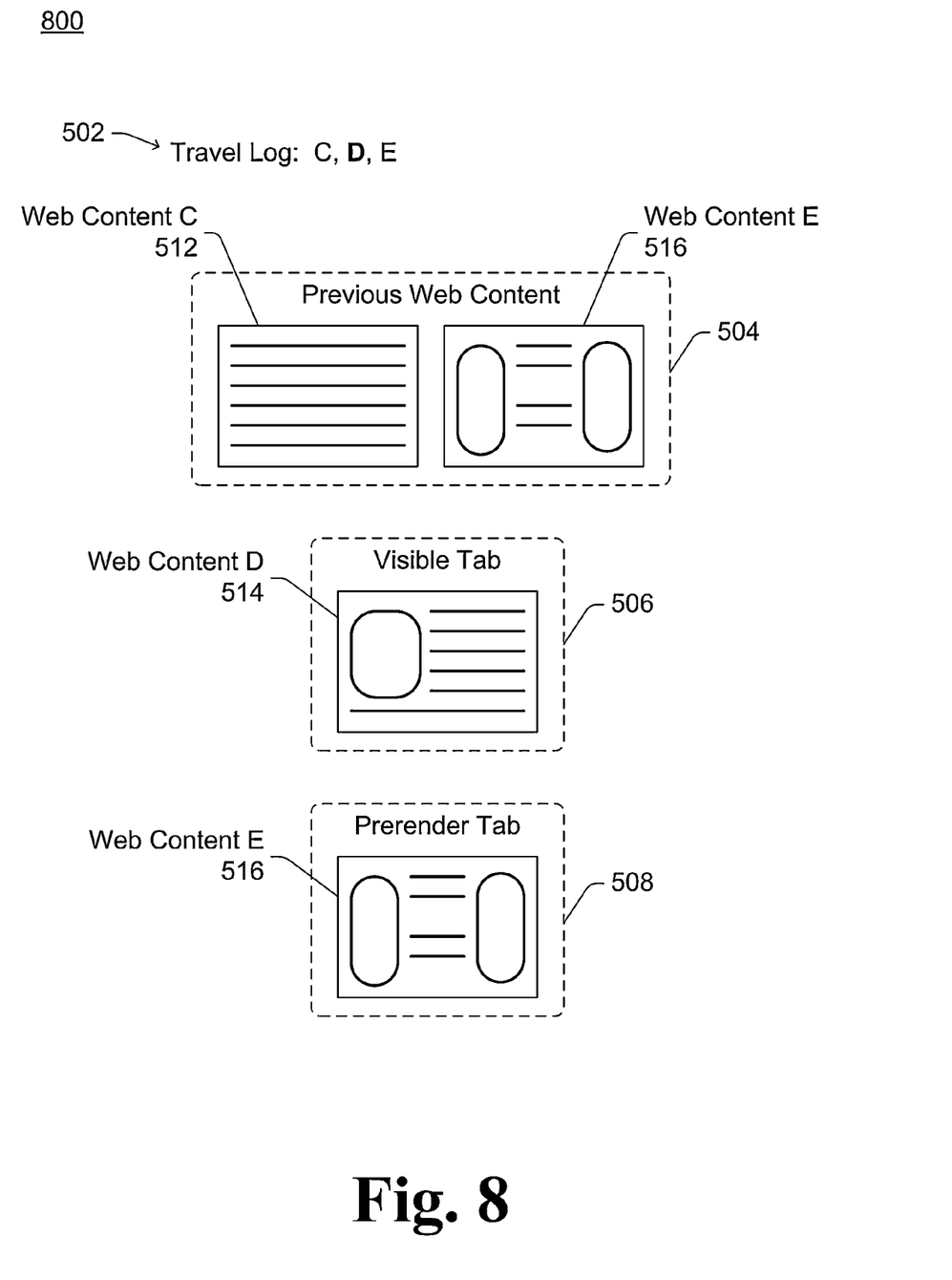

Continuing with the examples of FIGS. 5-8, based on the information 700 in FIG. 7, in response to detecting a user input having a threshold likelihood of being a navigation input to navigate forward, the Web application begins rendering Web content E in the empty tab 508, which becomes a prerender tab. The travel log 502 indicates the order in which Web content was accessed, so navigating forward from Web content D would be navigating to Web content E. FIG. 8 illustrates example information 800 resulting from detecting a user input having a threshold likelihood of being a navigation input to navigate forward based on the information 700 of FIG. 7. The information 800 includes previous Web content 504 and a visible tab 506 analogous to information 700. However, in the tab 508 (now a prerender tab) the Web content E 516 is beginning to be rendered.

If the user input becomes the navigation input to navigate forward, then the Web application switches to displaying Web content E 516. FIG. 5 illustrates example information 500 resulting from the user input becoming the navigation input to navigate forward. However, if the user input does not become the navigation input to navigate forward, then the Web application ceases rendering the Web content in the prerender tab 508 and does not switch to displaying Web content E 516. FIG. 7 illustrates example information 500 resulting from the user input not becoming the navigation input to navigate forward.

In the examples and discussions herein, reference is made to navigating forward or backward to the immediately succeeding or preceding previously accessed Web content. This can also be referred to as navigating forward or backward one step. Alternatively, navigation inputs can indicate to navigate forward or backward multiple steps, such as navigate backward two steps (e.g., from Web content E to Web content C in the example of FIGS. 5-8), navigate back to the beginning (of the travel log), and so forth.

Returning to FIG. 1, the tab switching module 128 manages how many empty tabs are maintained for the Web application 106. The number of empty tabs maintained is a balance of system performance (e.g., the speed with which Web content is displayed in response to a navigation input) and resource usage (e.g., the amount of memory and/or other system resources consumed by the empty tabs). In one or more embodiments, tab switching module 128 keeps one empty tab for the Web application 106, generating a new empty tab if the number of empty tabs drops below one, and deleting an empty tab if the number of empty tabs becomes greater than one. Alternatively, the tab switching module 128 can keep other numbers of empty tabs for the Web application 106.

The Web content lifetime management module 128 manages how long Web content is maintained. The Web content from closed tabs can be maintained in a cache or in other manners as discussed above. However, situations can arise in which the Web content need no longer be maintained, and in such situations the Web content lifetime management module 128 deletes or otherwise removes the Web content. In one or more embodiments, Web content that will no longer be accessed when a user is navigating back and forth through previously accessed Web content is deleted or otherwise removed. For example, assume the travel log indicates that the user accessed Web content A, then Web content B, then Web content C, then Web content D. Assume the user then navigates back twice to display Web content B, and then provides a user input to access Web content E. In this example, Web content C and Web content D would no longer be accessed when the user is navigating back and forth through previously accessed content (if the user were to navigate back to Web content B and then navigate forward, he or she would navigate to Web content E rather than Web content C). Thus, in this example the Web content lifetime management module deletes or otherwise removes Web content C and Web content D.

In some situations the Web application supports peek functionality that, in response to a user input, displays in a portion of the visible tab (or alternatively elsewhere) a screenshot of at least part of the previously displayed Web content. It should be noted that this peek functionality is different from the techniques discussed herein, as the techniques discussed herein begin to render the Web content and do so in an empty tab that is not visible. The techniques discussed herein can, however, be used in conjunction with the peek functionality. For example, Web content can begin to be rendered in an empty tab concurrently with displaying at least part of the previously displayed Web content.

It should also be noted that although the discussions herein refer to beginning rendering in a prerender tab the Web content that would be navigated to if the user input were a navigation input, situations can arise in which multiple different Web content could be the Web content navigated to. In such situations, one of the multiple Web content can be selected and rendered into the prerender tab, or alternatively each of the multiple different Web content can be rendered into multiple different prerender tabs (e.g., multiple empty tabs may have been generated in act 202 of FIG. 2). For example, an audible input of "navigate back" may be the navigation input to navigate back, and an audible input of "navigate forward" may be the navigation input to navigate forward. The user input of the word "navigate" may have a threshold likelihood of being a navigate back navigation input or a navigate forward navigation input. Thus, in response to detecting a user input of the word "navigate", the Web application may render the Web content that would be navigated to if the navigate back navigation input is received in one prerender tab, and the Web application may concurrently render the Web content that would be navigated to if the navigate forward navigation input is received in another prerender tab.

Thus, the techniques discussed herein allow Web content to be displayed to a user more quickly when the user is navigating to previously accessed Web content. The Web application can detect when it is likely (e.g., there is a threshold likeliness) that the user is navigating to previously accessed Web content and begin rendering that Web content in a hidden empty tab. If the Web application is correct and the user is navigating to the previously accessed Web content, the Web application has already begun rendering that previously accessed Web content and thus can do so more quickly than if the Web application had waited until the navigation input were completed. Furthermore, in situations in which the empty tab was previously generated, the time and resources to create a tab in which the Web content is rendered need not be expended when the user is navigating to the previously accessed Web content. On the other hand, if the Web application is incorrect and the user is not navigating to the previously accessed Web content, the rendering of the Web content ceases, and the Web content need never be displayed to the user.

Although particular functionality is discussed herein with reference to particular modules and applications, it should be noted that the functionality of individual modules and/or applications discussed herein can be separated into multiple modules and/or applications, and also noted that at least some functionality of multiple modules and/or applications can be combined into a single module and/or application. Additionally, a particular module and/or application discussed herein as performing an action includes that particular module and/or application itself performing the action, or alternatively that particular module and/or application invoking or otherwise accessing another component, module, or application that performs the action (or performs the action in conjunction with that particular module and/or application). Thus, a particular module and/or application performing an action includes that particular module and/or applications itself performing the action, as well as another module and/or applications invoked (or otherwise accessed) by that particular module and/or applications performing the action.

Figure 9:
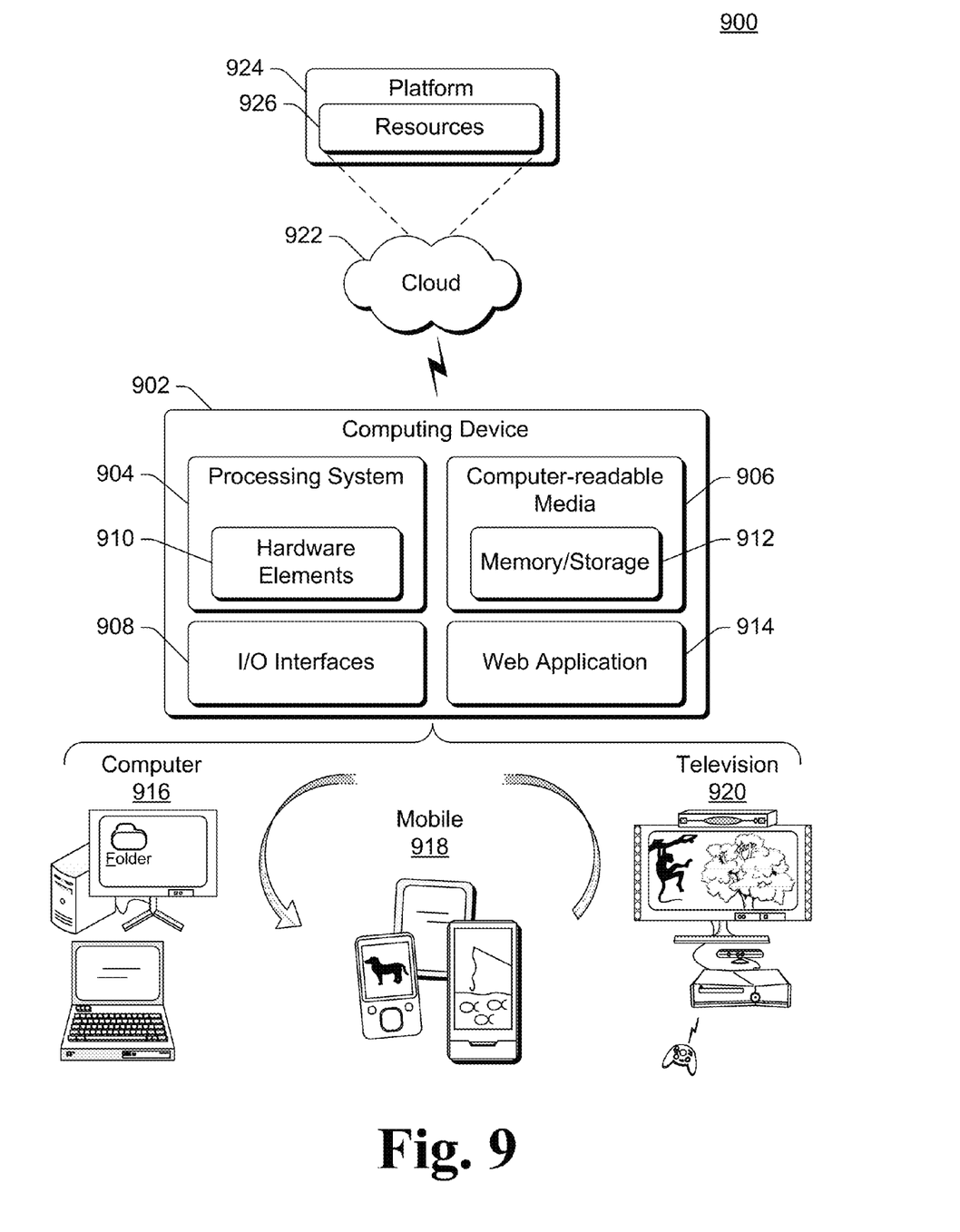
FIG. 9 illustrates an example system that includes an example computing device that is representative of one or more systems and/or devices that may implement the various techniques described herein.

FIG. 9 illustrates an example system generally at 900 that includes an example computing device 902 that is representative of one or more systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Computing device 902 also includes a Web application 914. Web application 914 is a Web application as discussed above, such as Web application 106 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 902 may assume a variety of different configurations, such as for computer 916, mobile 918, and television 920 uses. Each of these configurations includes devices that may have generally different constructs and capabilities, and thus the computing device 902 may be configured according to one or more of the different device classes. For instance, the computing device 902 may be implemented as the computer 916 class of a device that includes a personal computer, desktop computer, a multi-screen computer, laptop computer, netbook, and so on.

The computing device 902 may also be implemented as the mobile 918 class of device that includes mobile devices, such as a mobile phone, portable music player, portable gaming device, a tablet computer, a multi-screen computer, and so on. The computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 922 via a platform 924 as described below.

The cloud 922 includes and/or is representative of a platform 924 for resources 926. The platform 924 abstracts underlying functionality of hardware (e.g., servers) and software resources of the cloud 922. The resources 926 may include applications and/or data that can be utilized while computer processing is executed on servers that are remote from the computing device 902. Resources 926 can also include services provided over the Internet and/or through a subscriber network, such as a cellular or Wi-Fi network.

The platform 924 may abstract resources and functions to connect the computing device 902 with other computing devices. The platform 924 may also serve to abstract scaling of resources to provide a corresponding level of scale to encountered demand for the resources 926 that are implemented via the platform 924. Accordingly, in an interconnected device embodiment, implementation of functionality described herein may be distributed throughout the system 900. For example, the functionality may be implemented in part on the computing device 902 as well as via the platform 924 that abstracts the functionality of the cloud 922.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    displaying first Web content in a visible tab of a Web application;
    detecting, while displaying the first Web content in the visible tab, a user input that has a threshold likelihood of being a navigation gesture but that is not yet the navigation gesture;
    generating, responsive to the detecting the user input that has the threshold likelihood of being the navigation gesture but that is not yet the navigation gesture, an empty tab of the Web application;
    identifying second Web content in a travel log that would be navigated to if the user input were the navigation gesture, the travel log identifying previously accessed Web content;
    beginning rendering the second Web content in the empty tab, the empty tab becoming a prerender tab;
    associating, responsive to the beginning rendering the second Web content in the empty tab, the travel log with the empty tab, the empty tab and the visible tab each having respective corresponding travel logs;
    displaying, concurrent with the rendering the second Web content in the empty tab, at least part of the second Web content in the visible tab; and
    switching, in response to the user input becoming the navigation gesture, the prerender tab to be the visible tab, resulting in displaying the second Web content.

2. A method as recited in claim 1, the Web application comprising a Web browser, the first Web content comprising a first Web page, and the second Web content comprising a second Web page.

3. A method as recited in claim 1, the switching further comprising closing the previous visible tab.

4. A method as recited in claim 1, the switching further comprising saving state information for the first Web content in a travel log associated with the visible tab, the state information for the first Web content describing how the first Web content was displayed.

5. A method as recited in claim 4, the state information including a location of the first Web content that was displayed.

6. A method as recited in claim 4, the state information including a zoom setting for the first Web content.

7. A method as recited in claim 1, the switching further comprising:
    obtaining state information for the second Web content from the travel log, the state information for the second Web content describing how the second Web content was previously displayed; and
    displaying, based on the state information for the second Web content, the second Web content in the same manner as the second Web content was previously displayed.

8. A method as recited in claim 1, further comprising ceasing rendering the second Web content in the prerender tab in response to the user input not becoming the navigation gesture.

9. A method as recited in claim 1, further comprising closing the previous visible tab in response to the user input becoming the navigation gesture.

10. A method as recited in claim 1, the user input comprising a gesture on a touchscreen or touchpad.

11. A method as recited in claim 1, the user input comprising a hand motion sensed by a camera of a device implementing the method.

12. A computing device comprising:
    one or more processors; and
    one or more computer-readable media having stored thereon multiple instructions that, responsive to execution by the one or more processors, cause the one or more processors to perform acts comprising:
        displaying first Web content in a visible tab of a Web application;
        detecting, while displaying the first Web content in the visible tab, a user input that has a threshold likelihood of being a navigation input to navigate to second Web content identified in a travel log but that is not yet the navigation input, the travel log identifying previously accessed Web content;
        generating, responsive to the detecting the user input that has the threshold likelihood of being the navigation input but that is not yet the navigation input, an empty tab of the Web application;
        beginning rendering the second Web content in the empty tab, the empty tab becoming a prerender tab;
        associating, responsive to the beginning rendering the second Web content in the empty tab, the travel log with the empty tab, the empty tab and the visible tab each having respective corresponding travel logs;
        displaying, concurrent with the rendering the second Web content in the empty tab, at least part of the second Web content in the visible tab; and
        switching, in response to the user input becoming the navigation input, the prerender tab to be the visible tab, resulting in displaying the second Web content.

13. A computing device as recited in claim 12, the Web application comprising a Web browser, the first Web content comprising a first Web page, and the second Web content comprising a second Web page.

14. A computing device as recited in claim 12, the switching further comprising closing the previous visible tab.

15. A computing device as recited in claim 12, the switching further comprising:
    obtaining state information for the second Web content from the travel log, the state information for the second Web content describing how the second Web content was previously displayed; and
    displaying, based on the state information for the second Web content, the second Web content in the same manner as the second Web content was previously displayed.

16. A computing device as recited in claim 12, further comprising ceasing rendering the second Web content in the prerender tab in response to the user input not becoming the navigation gesture.

17. A computing device as recited in claim 12, further comprising closing the previous visible tab in response to the user input becoming the navigation gesture.

18. A computing device as recited in claim 12, the user input comprising a gesture on a touchscreen or touchpad.

19. A computing device as recited in claim 12, the user input comprising a hand motion sensed by a camera of a device implementing the method.

20. A computer-readable storage medium having stored thereon multiple instructions that, responsive to execution by one or more processors of a computing device, cause the one or more processors to perform acts comprising:
- displaying a first Web page in a visible tab of a Web browser;
- detecting, while displaying the first Web page in the visible tab, a user input that has a threshold likelihood of being a navigation gesture but that is not yet the navigation gesture;
- generating, responsive to the detecting the user input that has the threshold likelihood of being the navigation gesture but that is not yet the navigation gesture, an empty tab of the Web application;
- identifying a second Web page in a travel log that would be navigated to if the user input were the navigation gesture, the travel log identifying previously accessed Web content;
- beginning rendering the second Web page in the empty tab, the empty tab becoming a prerender tab;
- associating, responsive to the beginning rendering the second Web page in the empty tab, the travel log with the empty tab, the empty tab and the visible tab each having respective corresponding travel logs;
- displaying, concurrent with the rendering the second Web page in the empty tab, at least part of the second Web page in the visible tab;
- switching, in response to the user input becoming the navigation gesture, the prerender tab to be the visible tab, resulting in displaying the second Web page, the switching including,
  - saving state information for the first Web page in a travel log associated with the visible tab, the state information for the first Web page describing how the first Web page was displayed,
  - obtaining state information for the second Web page from the travel log associated with the empty tab, the state information for the second Web page describing how the second Web page was previously displayed, and
  - displaying, based on the state information for the second Web page, the second Web page in the same manner as the second Web page was previously displayed; and
- clearing the prerender tab in response to the user input not becoming the navigation gesture.

* * * * *